R. P. JACKSON.
ALTERNATING DIRECT CURRENT SYSTEM OF CONTROL.
APPLICATION FILED DEC. 18, 1905. RENEWED MAR. 15, 1909.
967,389.
Patented Aug. 16, 1910.
4 SHEETS—SHEET 1.
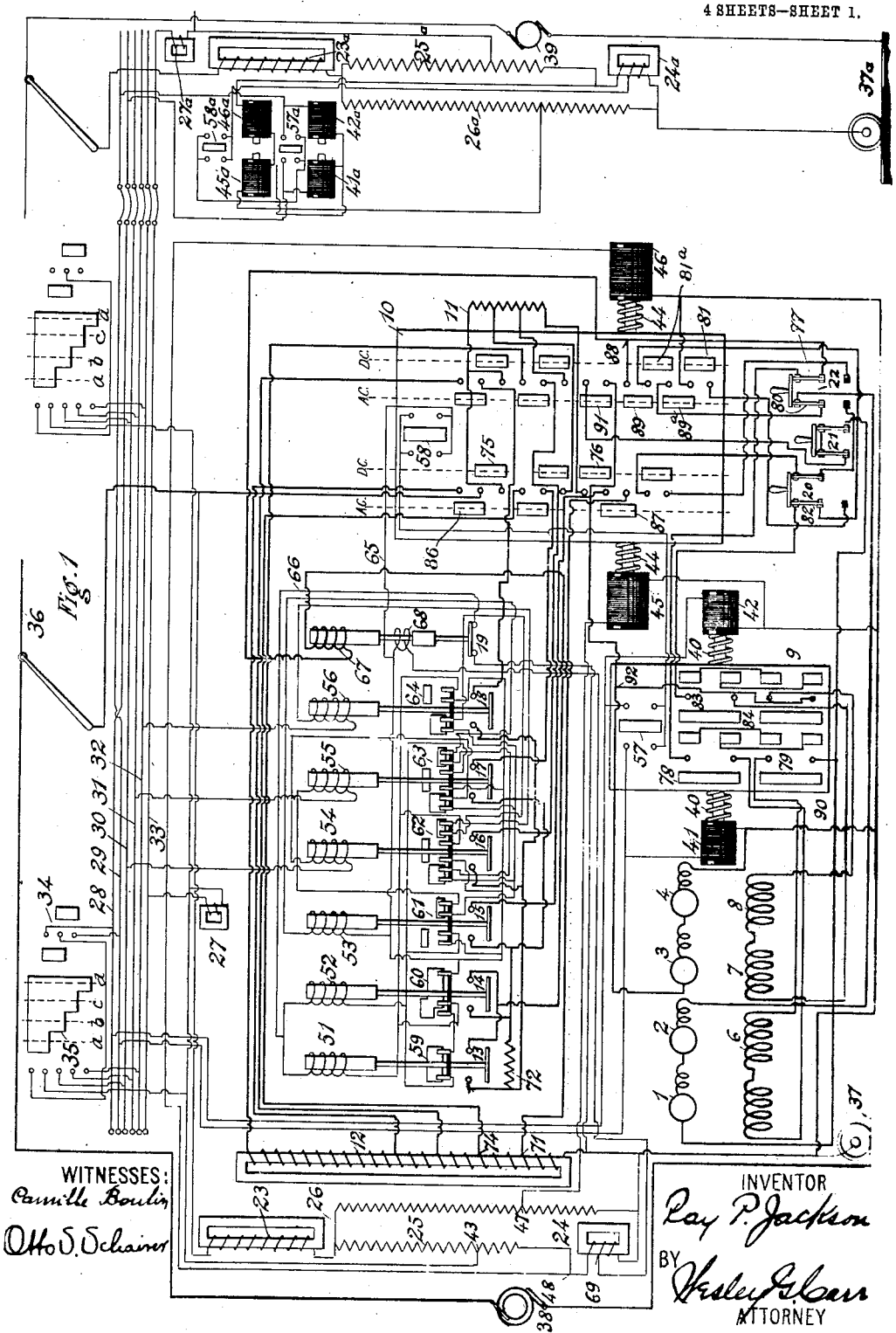
WITNESSES:
Camille Boulin
Otto S. Schairer
INVENTOR
Ray P. Jackson
BY
Wesley G. Carr
ATTORNEY R. P. JACKSON.
ALTERNATING DIRECT CURRENT SYSTEM OF CONTROL.
APPLICATION FILED DEC. 18, 1905. RENEWED MAR. 15, 1909.
967,389.
Patented Aug. 16, 1910.
4 SHEETS—SHEET 2.
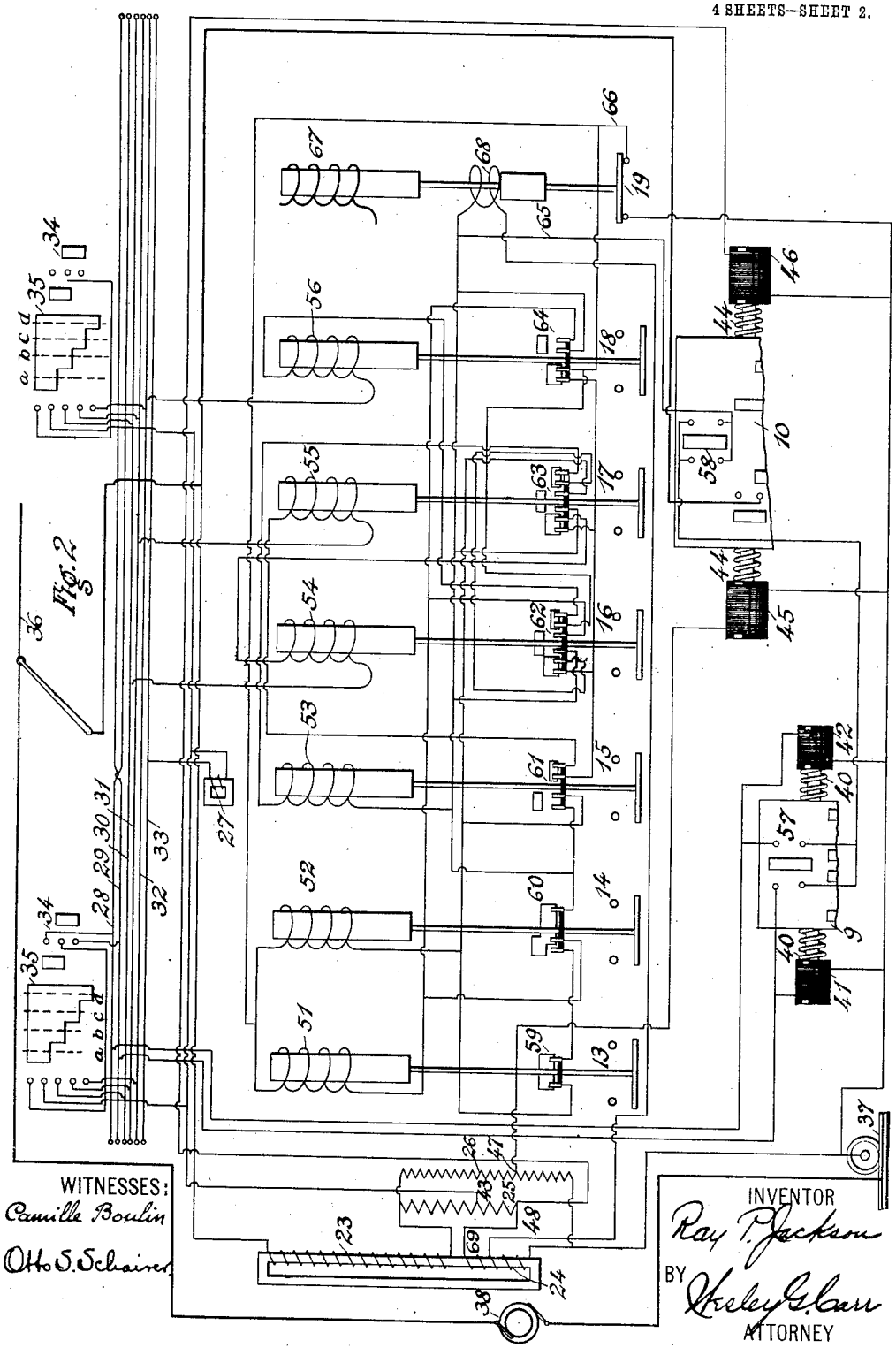
WITNESSES:
Camille Boulin
Otto S. Schairer
INVENTOR
Ray P. Jackson
BY Wesley G. Carr
ATTORNEY

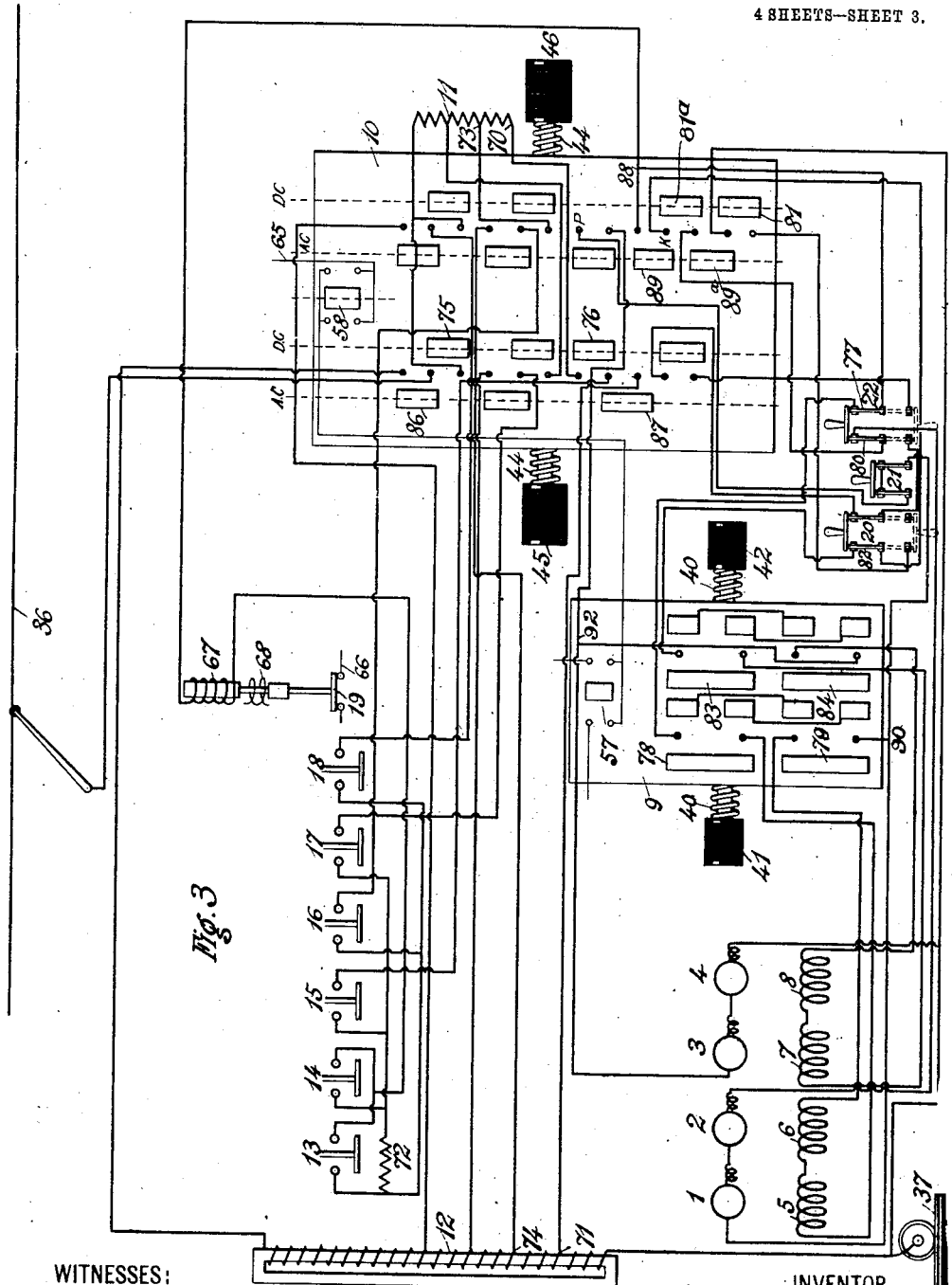

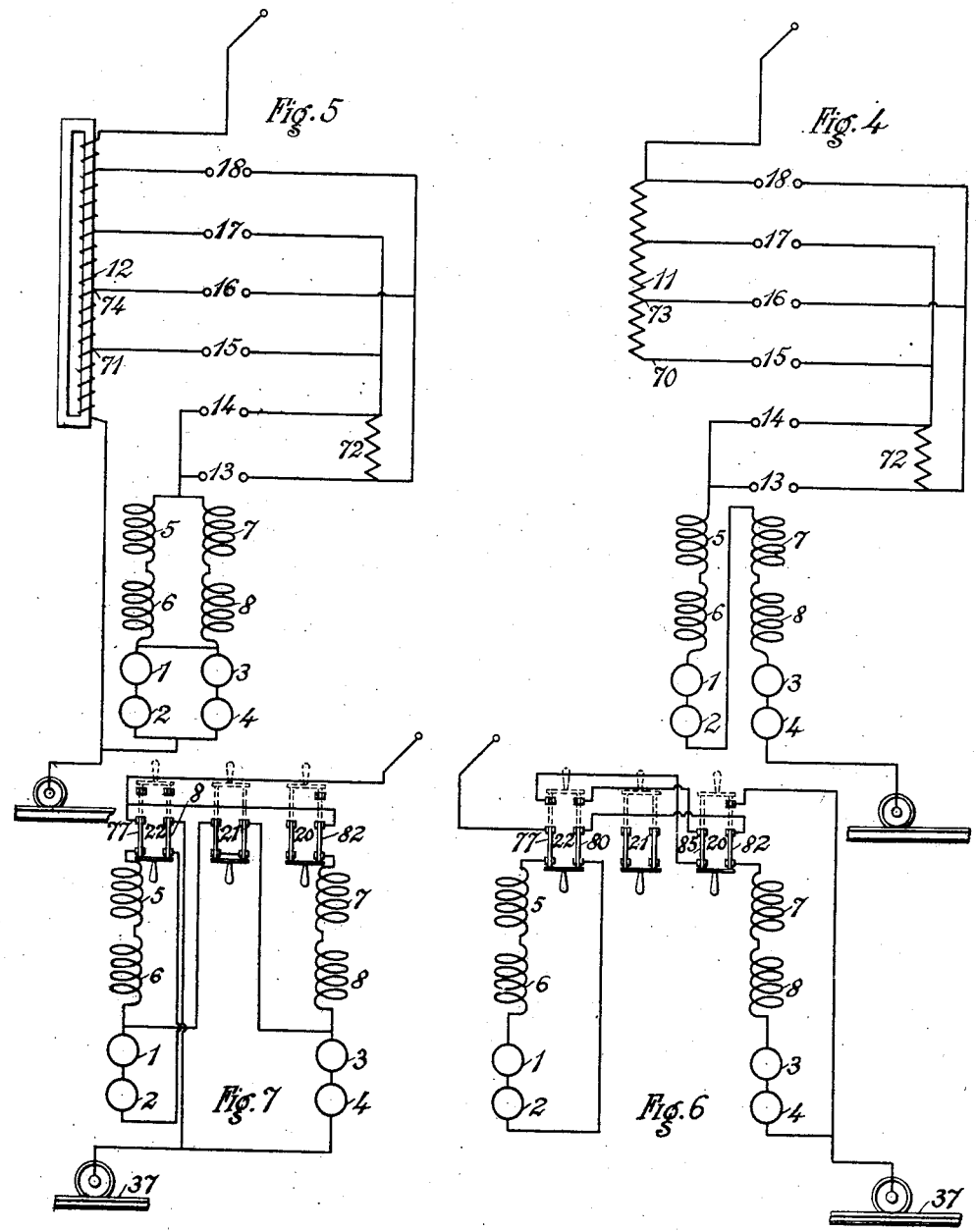

UNITED STATES PATENT OFFICE.

RAY P. JACKSON, OF WILKINSBURG, PENNSYLVANIA, ASSIGNOR TO WESTINGHOUSE ELECTRIC & MANUFACTURING COMPANY, A CORPORATION OF PENNSYLVANIA.

ALTERNATING-DIRECT-CURRENT SYSTEM OF CONTROL.

967,389.  Specification of Letters Patent.  Patented Aug. 16, 1910.

Application filed December 18, 1905, Serial No. 292,235. Renewed March 15, 1909. Serial No. 483,638.

*To all whom it may concern:*

Be it known that I, RAY P. JACKSON, a citizen of the United States, and a resident of Wilkinsburg, in the county of Allegheny and State of Pennsylvania, have invented a new and useful Improvement in Alternating-Direct-Current Systems of Control, of which the following is a specification.

My invention relates to systems of control for electric motors and particularly to systems of control for motors or other translating devices that are adapted to be operated by either alternating or direct currents.

The object of my invention is to provide a system of control for devices of the above specified character whereby the control or auxiliary circuits of the system may be supplied automatically with alternating or direct current and whereby the circuit relations of the motors may be adjusted automatically in accordance with the character of energy that may be supplied from the distributing circuit.

Since the development of a commutator type of alternating current motor which may also be operated satisfactorily by direct current, it has become desirable to equip electric railway vehicles therewith, and particularly such vehicles as are employed in interurban service, as the vehicles may then be operated in cities and towns upon existing direct current systems and by alternating current in rural districts, where greater efficiency in long distance transmission may be obtained by the use of alternating current than by direct current and the expense of the transmission system be thereby reduced.

Alternating currents may be transformed efficiently from one voltage to another by means of very simple and comparatively inexpensive apparatus and may consequently be transmitted over a railway system at a high voltage and be utilized by the motors at a low voltage, while the means for effecting voltage transformation of direct currents are complicated and expensive and can be utilized only when the change of potential is small. It follows, therefore, that direct currents are usually applied to the motors at the transmission voltage.

It has generally been found most expedient to arrange the motors in different circuit relations when operated by alternating currents than when operated by direct currents; for instance, when a vehicle is provided with four motors, the motors may conveniently be connected in series-parallel relation when operated by alternating currents and in series relation when operated by direct currents.

My invention provides means whereby the control or governing circuits of the system may be supplied automatically with the same character of energy as that derived from the distributing circuit.

It also provides means whereby the circuit relations of the motors may be changed automatically as the character of the energy supplied to the system is changed.

Other features of novelty will be noted more specifically hereinafter and in the appended claims.

Figure 1 of the accompanying drawings is a diagrammatic view of a complete system embodying my invention. Fig. 2 is a diagrammatic view, upon an enlarged scale, of the control or auxiliary circuits of the system shown in Fig. 1. Fig. 3 is a diagrammatic view of the motor circuits of the system shown in Fig. 1. Fig. 4 is a simplified diagrammatic view of the conditions of the motor circuits when supplied with direct currents. Fig. 5 is a similar view of the motor circuits when supplied with alternating currents. Fig. 6 is a simplified diagrammatic view showing the arrangement of the cut-out switches and the conditions of the motor circuits when direct currents are supplied to the motors, and Fig. 7 is a similar view illustrating the conditions when alternating currents are supplied to the motors.

The system comprises among its important elements two pairs of motors having armatures 1, 2, 3 and 4 and field magnet windings 5, 6, 7 and 8; a reversing switch 9; a change-over switch 10, the principal function of which is to arrange the circuit relations of the motors in accordance with the character of the energy that may be supplied thereto; a main resistance device 11; a transformer 12; a plurality of switches 13, 14, 15, 16, 17 and 18 that are adapted to govern the amount of the resistance 11 or the active length of the winding of the transformer 12 that may be included in the motor circuits; an overload relay switch 19 that causes the switches 13 to 18, inclusive, to open when more than a predetermined amount of current is supplied to the motors and that therefore prevents closure thereof until the reversing and change-over switches have been returned to their initial positions; cut-out switches 20, 21 and 22; impedance or inductive resistance windings 23 and 24; an auxiliary ohmic resistance device 25 that is connected in series with and between the inductive resistance windings 23 and 24; another device 26 of comparatively high ohmic resistance that is connected in shunt circuit to the devices 24 and 25; a choke-coil 27, train conductors 28, 29, 30, 31, 32 and 33 that may extend through a train comprising a plurality of vehicles that are severally equipped with the system; a master switch 34 for controlling operation of the reversing switch and a master switch 35 for controlling operation of the switches 13 to 18, inclusive. The circuits are adapted to be supplied with either alternating or direct current from a trolley conductor 36 and a grounded return conductor or track rail 37 that may be supplied with energy either from an alternating current generator 38 or from a direct current generator 39, or from other suitable sources.

The ohmic and inductive resistances of the devices 23, 24, 25 and 26 are so adjusted with reference to each other that most of the potential drop in the circuit occurs in the ohmic resistance devices 25 and 26 when direct currents are supplied to the system, and in the inductive resistance windings 23 and 24 when alternating currents are supplied to the system. The desired relation may be secured, as will be readily understood, by making the windings 23 and 24 of low ohmic resistance and high inductive resistance and by so designing the devices 25 and 26 that they shall possess only ohmic resistance, that of the device 26 being preferably large as compared with that of the device 25.

The reversing switch 9 is maintained in the position shown by means of centralizing springs 40 and operation thereof to the left and to the right, respectively, for the purpose of arranging the circuits of the motors for forward and reverse rotation is controlled by means of magnet windings 41 and 42, one terminal of each of which is connected to the grounded return conductor or track rail 37 and the other terminals of which are adapted to be connected to a point 43 in the auxiliary resistance 25 by means of the master switches 34 and 35.

The magnet windings 41 and 42 are so constructed that only very small amounts of current are required to energize them, and it has generally been found necessary to apply higher alternating than direct current voltages thereto in order to cause the required amounts of current to traverse the windings. It is well understood that, when only a small amount of current is derived from a circuit in shunt to a resistance, the voltage applied to the shunt circuit is very nearly equal to the difference of potential which would exist between the points in the resistance to which the shunt circuit is connected if no such circuit were established. Consequently, the voltage which is applied to the magnet windings 41 and 42 when direct current is supplied to the system is very nearly equal to the difference of potential which would otherwise exist between the point 43 in the resistance device 25 and the grounded conductor 37. When alternating current is supplied to the system, the voltage applied to the windings 41 and 42 will be but little more than the difference of potential existing between the terminals of the inductive winding 24, because only a small portion of the drop of potential then occurs in the ohmic resistance device 25. The inductive winding 24 may be so constructed that this voltage will be considerably higher than the corresponding direct current voltage, thereby insuring energizing of the magnet windings. The manner in which this portion of the system operates may be best understood by assigning specific values to the various quantities. If the system is supplied with direct current at five hundred volts, the ohmic resistance of the winding 23 is fifty ohms, that of the device 25 one hundred and fifty ohms, that of the device 26 two thousand ohms and that of the winding 24 so small as to be practically negligible, the amount of current which will traverse the device 25 is 2.45 amperes and the drop of potential therein is three hundred and sixty-eight volts. If the resistance of the circuit between the point 43 in the device 25 and the grounded conductor 37 is 16.3 ohms, and of the circuit in shunt thereto is two hundred ohms, the drop in voltage over the two circuits is about thirty-seven volts and the current in the shunt circuit is .185 amperes, while the drop in potential which would occur between the point 43 and the grounded conductor would be forty volts if no circuit existed in shunt thereto. The magnet windings may, of course, be constructed so that they will become energized when .185 amperes or less traverse them.

The inductive resistances of the devices 23 and 24 may be such that when alternating current is supplied to the system, drops of potential of two hundred and seventy-five and two hundred volts respectively will occur therein, the remaining twenty-five volts of drop occurring in the resistance device 25. Then approximately two hundred volts are applied to the magnet windings 41 and 42.

The change-over switch 10 is maintained normally in the position shown by means of centralizing springs 44 and operation thereof to the left and to the right for the purpose of arranging the circuits for operating the motors by direct and alternating currents, respectively, is effected by magnet windings 45 and 46. One terminal of each of the windings 45 and 46 is connected to the track rail 37 and the remaining terminals are connected respectively to a point 47 in the auxiliary resistance device 26 and to junction 48 of the terminals of the inductive and non-inductive resistance devices 24 and 25.

It will be observed that the magnet winding 45 of the change-over switch is supplied with direct current from the resistance device 26 in a manner similar to that in which the windings 41 and 42 of the reversing switch are supplied from the resistance device 25, and the magnet winding 46 is supplied with alternating current from the inductive resistance winding 24 in a manner similar to that in which the windings 41 and 42 are also supplied therefrom, and the modes of operation are in all respects similar.

The switches 13 to 18, inclusive, are governed in their operation by means of magnet windings 51, 52, 53, 54, 55 and 56, respectively, the circuits of which are adapted to be controlled manually by the master switch 35 and automatically by means of an interlocking switch 57 that is operated by the reversing switch 9, an interlocking switch 58 that is operated by the change-over switch 10, interlocking switches 59, 60, 61, 62, 63 and 64 that are operated respectively by switches 13 to 18, inclusive, and by means of the overload relay switch 19. It will be observed that the magnet windings 51 to 56, inclusive, are connected between conductors 65 and 66, the interlocking switches 57 and 58 being located in the circuit of the former and the overload relay switch 19 being located in the circuit of the latter, and that they are otherwise supplied with energy in the same manner as the magnet windings 41 and 42 of the reversing switch. The interlocking switch 57 prevents the supply of energy to the magnet windings 51 to 56, inclusive, until the reversing switch has been moved to either its forward or reverse position, and the interlocking switch 58 also prevents energizing of the magnet windings 51 to 56, inclusive, until the change-over switch has arranged the circuits of the motors for operation thereof by either alternating or direct currents.

The overload relay switch 19 is operated by means of a magnet winding 67 that is so arranged in circuit with the motors that when the current supplied thereto exceeds a predetermined amount the switch 19 will be caused to open, thereby interrupting the circuits of the magnet windings 51 to 56, inclusive, and permitting the switches 13 to 18 to open. A magnet winding 68, the terminals of which are connected respectively to conductor 65 and to a suitable point 69 in the inductive resistance winding 24, serves to retain the overload relay switch in the open position, after having been opened, until its circuit is interrupted by the opening of the interlocking switches 57 and 58, that is caused by the return of the reversing and change-over switches to their initial or "off" positions. One terminal of the retaining magnet winding 68 is adapted to be connected by means of the interlocking switches 57 and 58 and the master switches 34 and 35 to the point 43 in the resistance device 25 and the other terminal is connected directly to the point 69 in the inductive winding 24, from which it is seen that it is arranged in a shunt circuit to a portion of the resistance device 25 and of the inductive winding 24.

The interlocking switches 59 to 64, inclusive, are provided for the purpose of permitting the switches 13 to 18, inclusive, to close only in a predetermined order, the manner in which these switches operate being evident from the drawings and particularly from Fig. 2, and since they form no part of my present invention, I deem it unnecessary to explain their operation in detail, it being only necessary to state the order of closure of the switches.

When the master switch 35 is moved to position a, the switches 13 and 15 are first closed and then switches 14 and 15. From the simplified diagram of the motor circuits of Figs. 4 and 5, it is seen that upon closure of the switches 13 and 15, the motors are connected in circuit between the grounded conductor 37 and either terminal 70 of the resistance device 11 or a point 71 in the transformer 12, according as the change-over switch is in position to arrange the circuits of the motors for operation by direct or by alternating current, the resistance 72 being included in circuit therewith. Upon closure of the switches 14 and 15 and opening of the switch 13, the resistance 72 is removed from the motor circuit. If the master switch 35 is moved to position b, the switches 14 and 16 will first close and then the switches 13 and 16. When the switches 14 and 16 are closed, the motors are connected either to a point 73 in the resistance device 11 or to a point 74 in the transformer 12 with the resistance 72 included in the circuit, the latter being removed from the circuit when the switches 13 and 16 are closed. When the master switch is moved to position c, switches 13 and 17 are closed and then switches 14 and 17, and when it occupies position d, the switches 14 and 18 are first closed and then switches 13 and 18, the circuits being altered in each case in a manner similar to what has just been described for the positions a and b, as will be readily understood from consideration of Figs. 4 and 5. The function of the resistance 72 is to prevent an excessive flow of current when the various portions of the transformer winding 12 are connected in closed circuit by reason of simultaneous closure of successive switches and it serves the additional function of a resistance in the motor circuit.

When the magnet winding 45 is energized in the manner which has been described hereinbefore, the segments of the change-over switch that are located upon the dot and dash lines D—C are brought into engagement with the corresponding contact fingers and a circuit is established from the trolley conductor 36, through conducting segment 75, resistance device 11, conducting segment 76 (if the master switch 35 occupies the position a), switch 15, resistance 72, switch 13, magnet winding 67 of the overload relay switch 19, blade 77 of the cut-out switch 22, conducting segment 78 of the reversing switch, field magnet windings 5 and 6 of the motors, conducting segment 79 of the reversing switch, armatures 1 and 2 of the motors, blade 80 of the cut-out switch 22, conducting segment 81ª of the change-over switch, blade 82 of the cut-out switch 20, conducting segment 83 of the reversing switch, field magnet windings 7 and 8, conducting segment 84 and armatures 3 and 4, to the grounded conductor 37. Thus, the motors are connected in series with the resistances 11 and 72 in circuit, as shown in Fig. 4, the latter being removed from the circuit as the switches 13 to 18, inclusive, are closed in the hereinbefore stated order.

In Fig. 6 is shown a simplified diagram of the motor circuits when connected for direct current operation and with the cut-out switches properly arranged therein, from which it is seen that if the switch 22 is moved to the position shown in broken lines, the motor armatures 1 and 2 and field magnet windings 5 and 6 are removed from the circuit and a circuit established through the blades 77 of the switch 22 in the position shown in broken lines, blade 85 of switch 20, the blade 80 of the switch 22, blade 82 of the switch 20, field magnet windings 7 and 8 and armatures 3 and 4. If the switch 20 is moved to the position shown in broken lines, a circuit may be established through the blade 77 of the switch 22, field magnet windings 5 and 6, and motor armatures 1 and 2, blade 80 of switch 22 and blade 82 of switch 20 in the position shown in broken lines, the motor armatures 3 and 4 and field magnet windings 7 and 8 being thereby removed from the circuit.

When the magnet winding 46 is energized, the change-over switch 10 is operated so as to bring the conducting segments that are located upon the dot and dash lines A—C into engagement with the corresponding contact fingers, and the motors are connected in series-parallel relation with an equalizing connection between the junctions of the armature windings with the field magnet windings, as illustrated in Fig. 5. This will be best understood by tracing the circuit from the trolley conductor 36, conducting segment 86 of the change-over switch and transformer winding 12, to track rail 37. The motors are then connected in a circuit from a point 71 in the transformer winding 12, conducting segment 87 of the change-over switch, switches 15 and 14 (if the master switch occupies the position a) and magnet winding 67 of the overload relay switch 19, to a point 88, where the circuit divides, one portion traversing conducting segment 89, blade 82 of cut-out switch 20, segment 83 of the reversing switch (if the master switch 34 is operated so as to electrically connect the corresponding uppermost contact fingers), field magnet windings 7 and 8, conducting segment 84 of the reversing switch and armatures 3 and 4, to the track rail 37. The other portion of the circuit from the point 88 traverses blade 77, the cut-out switch 22, conducting segment 78 of the reversing switch, field magnet windings 5 and 6, conducting segments 79 of the reversing switch, armatures 1 and 2, blade 80 of cut-out switch 22 and conducting segment 89ª of the change-over switch, to the track rail 37. It will thus be seen that the motor armatures 1 and 2 and field magnet windings 5 and 6 are connected in series and also the motor armatures 3 and 4 and field magnet windings 7 and 8, and that the two pairs of motors are arranged in parallel, all as shown in Fig. 5. An equalizing connection is also made between the terminal 90 of the armature 1, which traverses a circuit through cut-out switch 21 and conducting segment 91 of the change-over switch, to terminal 92 of the armature 3.

Fig. 7 is a simplified diagram illustrating the conditions of the circuits for alternating current operation with the cut-out switches properly arranged therein, from which it will be seen that if the switch 22 is moved to the position shown in broken lines and the switch 21 opened, the motor armatures 1 and 2 and field magnet windings 5 and 6 are entirely removed from the circuit and the equalizing connection between the terminals of the armatures of the motors 1 and 3 is interrupted. If it is desired to remove the motor armatures 3 and 4 and field magnet windings 7 and 8 from the circuit, switch 20 should be moved to the position shown in broken lines and the switch 21 opened, whereby the circuit is interrupted at the terminal of the field magnet winding 7 and the equalizing connection between the terminals of the armatures 1 and 3 is broken.

In practice, the transmission system will generally be so arranged that a train comprising a plurality of cars may move directly from a section which is supplied with direct current to an adjacent section which is supplied with alternating current, or vice versa, and it may occur that when a train passes from one section to another, some of the cars will be supplied with direct current and the others with alternating current. In such cases, it is evidently necessary that the positions of the several change-over switches shall correspond to the character of the energy that is supplied to the respective cars to which they pertain, and I accordingly connect the choke-coil 27 between the train conductor 33 and the point 43 in the resistance device 25, in order to prevent the supply of alternating current through the train conductors from a car that is being operated by alternating current to the magnet winding of the change-over switch of another car which is being supplied with direct current. For instance, if alternating current is being supplied to the car which is equipped with the complete system shown in Fig. 1 and direct current is supplied to the next car in the rear, the control system of which is only partially shown, it will be observed that if it were not for the choke-coils 27 and 27ª alternating current might be supplied from the point 43 in the resistance 25, through the choke-coil 27, train conductor 33, choke-coil 27ª, resistance 25ª and inductive winding 24ª, a sufficient voltage being thereby impressed upon the inductive winding 24ª to cause an operating voltage to be applied to the terminal of the controlling magnet winding 46ª of the change-over switch on that car, thus causing the circuits of the motors to be arranged for the reception of alternating current while direct current is being supplied to the car.

The devices which have been illustrated in the drawings are only representative of any suitable means which may be employed for the purposes described, and it is consequently understood that the magnet windings which, as here shown, operate directly the devices to which they pertain may only serve to control the positions thereof, as by governing the supply of fluid-pressure or other means for operating the devices. The inductive resistance windings 23 and 24 may be placed upon different magnetic cores, as shown in Fig. 1, or upon the same core, as shown in Fig. 2. It will also be understood that the change-over switch may be constructed so as to arrange the motors in any other desired circuit relations than those shown and described, and that the system may be employed to control other translating devices than motors that are adapted for operation by either direct or alternating current.

In two other applications, Serial Numbers 292,234 and 292,236, respectively, filed by me of even date herewith, I have shown and described systems of control which differ from that herein disclosed in certain particulars that will be evident from a consideration thereof.

I claim as my invention:

1. The combination with circuit conductors for supplying either alternating or direct current energy, translating devices, a reversing switch, and a change-over switch for arranging the circuits of the translating devices, of controlling magnet windings for said switches each having a terminal connected to one of the supply conductors, two inductive resistances and one non-inductive resistance connected in series with each other and with the non-inductive resistance between the inductive resistances, a second non-inductive resistance arranged in parallel circuit with two of the first named resistances, means for connecting the reversing switch controlling magnet windings between a point of the first non-inductive resistance and a supply conductor, and connections between the remaining terminals of the change-over switch controlling magnet windings and points respectively of the second non-inductive resistance and of one of the inductive resistances.

2. The combination with conductors for supplying either alternating or direct current energy, of a plurality of independently operated units each of which comprises translating devices, a reversing switch, a change-over switch for arranging the circuits of the translating devices, controlling magnet windings for said switches, each having a terminal connected to one of the supply conductors, two inductive resistances and one non-inductive resistance connected in series with each other and with the non-inductive resistance between the inductive resistances, a second non-inductive resistance arranged in parallel circuit with two of the first named resistances, means for connecting the reversing switch controlling magnet windings between a point of the first non-inductive resistance and a supply conductor, connections between the remaining terminals of the change-over switch controlling magnet windings and points respectively of the second non-inductive resistance and of one of the inductive windings, conductors that connect corresponding points in the circuits pertaining to the different units, and inductive windings that are interposed in the connection between the points in the smaller resistance to which terminals of the reversing switch controlling magnet windings are connected.

3. The combination with a source of direct currents, a source of alternating currents, translating devices, a reversing switch, and a change-over switch for adjusting the circuits of the translating devices for operation thereof by either character of energy, of controlling magnet windings for the switches, two inductive windings, a non-inductive resistance that is arranged in series circuit with and between the inductive windings, a second non-inductive resistance arranged in parallel circuit with the first non-inductive resistance and one of said inductive windings, the change-over switch controlling magnet windings being arranged in parallel circuit respectively to one of the inductive windings and to a portion of the second non-inductive resistance, and means for connecting the reversing switch controlling magnet windings in parallel circuit to one of the inductive windings and a portion of the first non-inductive resistance.

4. The combination with a source of direct currents, a source of alternating currents, translating devices, a reversing switch, a change-over switch for adjusting the circuits of the translating devices for operation thereof by either character of energy, and a set of switches for further adjusting the circuits of the devices, of controlling magnet windings for the switches, two inductive windings, a non-inductive resistance that is arranged between and in series circuit with the inductive windings, a second non-inductive resistance arranged in parallel circuit with the first non-inductive resistance and one of the inductive windings, the change-over switch controlling magnet windings being arranged in parallel circuit respectively to one of the inductive windings and to a portion of the second non-inductive resistance, and means for connecting the magnet windings of the reversing switch and of the switches of the set in parallel circuit to one of the inductive windings and a portion of the first non-inductive resistance.

5. The combination with a source of direct currents, a source of alternating currents, translating devices, a reversing switch, a change-over switch for adjusting the circuits of the translating devices for operation thereof by either character of energy, and a set of switches for further adjusting the circuits of the devices, of controlling magnet windings for the switches, two inductive windings, a non-inductive resistance that is arranged between and in series circuit with the inductive windings, a second non-inductive resistance arranged in parallel circuit with the first non-inductive resistance and one of the inductive windings, the change-over switch controlling magnet windings being arranged in parallel circuit respectively to one of the inductive windings and to a portion of the second non-inductive resistance, means for connecting the magnet windings of the reversing switch and of the switches of the set in parallel circuit to one of the inductive windings and a portion of the first non-inductive resistance, and means for preventing operation of the switches of the set until after operation of the reversing switch.

6. The combination with a source of direct currents, a source of alternating currents, translating devices, two inductive resistances, a non-inductive resistance that is connected between and in series circuit with said inductive resistances, and a second non-inductive resistance that is arranged in parallel circuit with two of the other resistances, of means for arranging the circuits of the translating devices for operation thereof by either character of energy, and controlling means therefor that is supplied with energy from circuits in parallel respectively to one of the inductive resistances and to a portion of the second non-inductive resistance.

7. The combination with a source of direct currents, a source of alternating currents, translating devices, two inductive resistances, a non-inductive resistance that is connected between and in series circuit therewith, and another non-inductive resistance that is arranged in parallel circuit with two of the other resistances, of means for arranging the circuits of the translating devices for operation thereof by either character of energy, controlling means therefor that is supplied with energy from circuits in parallel respectively to one of the inductive resistances and to a portion of the second non-inductive resistance, means for further arranging the circuits of the translating devices, and controlling means therefor that is supplied with energy from a circuit in parallel to a portion of the first non-inductive resistance and one of the inductive resistances.

8. The combination with a source of alternating currents, a source of direct currents, a plurality of sets of translating devices, means for arranging the circuits of the translating devices in each set in accordance with the character of the energy that may be utilized, automatic controlling means therefor, and means for preventing sufficient amounts of the non-corresponding character of energy being conducted from the circuits of one set of the devices to the circuits of the other to cause operation of the said automatic controlling means.

9. The combination with circuit conductors for supplying either alternating or direct current energy, a plurality of translating devices and a plurality of change-over switches for arranging the circuits of the translating devices, of magnet windings for controlling operation thereof that may be energized respectively by alternating and direct currents, and means for preventing operative amounts of alternating current from being supplied to the controlling windings that are specially adapted to direct current operation and vice versa.

10. The combination with circuit conductors for supplying either alternating or direct current energy, a plurality of translating devices and a plurality of change-over switches for arranging the circuits of the translating devices, of magnet windings for controlling the operation thereof that may be energized respectively by alternating and direct currents, and means for preventing operative amounts of alternating current from being supplied to the controlling windings that are specially adapted to direct current operation, and vice versa, when a part of the translating devices are being supplied with direct current and the remainder with alternating current.

11. The combination with circuit conductors for supplying either alternating or direct current energy, a plurality of translating devices and a plurality of change-over switches for arranging the circuits of the translating devices, of magnet windings for controlling the operation thereof that may be energized respectively by alternating and direct currents, and one or more choke-coils for preventing operative amounts of alternating current from being supplied to the controlling windings that are specially adapted to direct current operation.

12. The combination with circuit conductors for supplying either alternating or direct current energy, a plurality of translating devices and a plurality of change-over switches for arranging the circuits of the translating devices, of magnet windings for controlling the operation thereof that may be energized respectively by alternating and direct currents, and one or more choke-coils for preventing operative amounts of alternating current from being supplied to the controlling windings that are specially adapted to direct current operation when a part of the translating devices are being supplied with direct current and the remainder with alternating current.

In testimony whereof, I have hereunto subscribed my name this 15th day of December, 1905.

RAY P. JACKSON.

Witnesses:
  OTTO S. SCHAIRER,
  BIRNEY HINES.